US006426793B2

(12) United States Patent
Emonot

(10) Patent No.: US 6,426,793 B2
(45) Date of Patent: Jul. 30, 2002

(54) PROCESS AND APPARATUS FOR FAULT DETECTION IN A LIQUID SHEET AND CURTAIN COATING PROCESS

(75) Inventor: Jerome Emonot, Chalon sur Saone (FR)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/507,159

(22) Filed: Feb. 18, 2000

(30) Foreign Application Priority Data

Jul. 15, 1999 (FR) ........................................... 99 09370

(51) Int. Cl.[7] ............................................... G01N 21/88

(52) U.S. Cl. .................... 356/237.1; 356/602; 356/608; 427/8; 427/420

(58) Field of Search .......................... 427/8, 9, 10, 420; 118/DIG. 4, 712; 356/237.1, 602, 608

(56) References Cited

U.S. PATENT DOCUMENTS 3,900,265 A * 8/1975 Merlen et al. .............. 356/200
4,247,204 A * 1/1981 Merlen et al. .............. 356/431
4,950,911 A * 8/1990 Williams et al. ............ 250/563
4,957,770 A * 9/1990 Howarth ......................... 427/9
5,190,789 A 3/1993 Finnicum ....................... 427/8

FOREIGN PATENT DOCUMENTS

| | | | |
|---|---|---|---|
| GB | 1 482 462 | | 8/1977 |
| JP | 09 173935 | | 7/1997 |
| JP | 9-173935 | * | 7/1997 |

* cited by examiner

*Primary Examiner*—Katherine A Bareford
(74) *Attorney, Agent, or Firm*—David A. Novais

(57) ABSTRACT

The present invention relates to a process and an apparatus for detecting a fault in a flowing liquid sheet and in particular in a coating curtain. The process comprises the following steps: transmitting an electromagnetic beam to the sheet so as to irradiate approximately the entire width of the sheet in a direction approximately transverse to the sheet; recovering a beam reflected by the sheet by way of a collector; defining a reference position of the reflected beam on the collector; and noting the deviations of the reflected beam in relation to the previously defined reference position.

15 Claims, 4 Drawing Sheets

PROCESS AND APPARATUS FOR FAULT DETECTION IN A LIQUID SHEET AND CURTAIN COATING PROCESS

FIELD OF THE INVENTION

The present invention relates to a process and an apparatus for detecting a fault in a liquid sheet and in particular in a coating curtain.

BACKGROUND OF THE INVENTION

In curtain coating processes, especially the coating of photographic compositions, the stability and uniformity of the curtain formed by the liquid composition are important parameters in obtaining an optimum coating quality. Various factors can cause the appearance of faults in the curtain, especially the appearance of waves that propagate in the curtain. A piece of dust on the coating lip or even a wetting fault of the lip or the edge guides of the curtain can cause the appearance of waves in the curtain. Similarly, the presence of the edge guides themselves is a constraint to the natural flow of the curtain that can generate the appearance of waves. These waves propagate up to the contact line with the medium to be coated so that the coating is not uniform. Other faults can appear by the presence of an air current that changes the curtain surface. Such disturbances cause, for example, thickness variations of the composition that are revealed, for example, by the appearance of streaks or lines. Photographic products are very sensitive to these variations. Therefore it is necessary to detect these waves to be able to stop the flow when a fault appears. Traditionally, before starting coating, the coating composition is run and the presence of a wave is observed with the naked eye. Such a method is limited in that it only allows detection of the faults that appear at the start of the flow. The waves that appear during coating, for example, due to the appearance of a piece of dust or any other disturbing item, cannot be detected as the deposition of the photographic layers is done in the dark. In addition, small waves are difficult to see with the naked eye, and yet they cause significant faults to the coating.

U.S. Pat. No. 5,190,789 describes a curtain coating apparatus and process using a photographic composition. During coating, a light or sound wave is sent to a point on the curtain using a transmitter-receiver to check the presence of a curtain, and the reflection of the wave. Measuring the time taken by the reflected wave to reach the transmitter-receiver, especially to check the curvature of the curtain also checks the position of the curtain. Such an apparatus does not enable checking for the presence of a fault that is not found on the entire curtain, like for example, the presence of a wave in the curtain. The wave emitted by the transmitter-receiver is sent to a precise place on the curtain and does not scan over it.

SUMMARY OF THE INVENTION

An object of the invention is to provide for a process and an apparatus that enable the fast detection of the presence of a fault in a liquid sheet, especially in a coating curtain. The detection process according to the invention is a reliable process that also enables detection of weakly pronounced faults.

Another object of the invention is to provide for a curtain coating process using a liquid composition wherein the presence of faults is detected in order to stop the flow of the liquid composition as soon as they are noted.

The present invention relates to a detection process of a fault in a flowing liquid sheet. The process comprises the steps of: transmitting an electromagnetic beam onto the sheet in order to irradiate approximately an entire width of the sheet in an approximately transverse direction of the sheet; recovering a beam reflected by the sheet by means of a collector; defining a reference position of the reflected beam on the collector; and noting deviations of the reflected beam in relation to the previously defined reference position.

The present invention also relates to a curtain coating process wherein a composition runs on a surface up to a lip from which the composition flows so as to form a curtain. The coating process comprises the steps of the fault detection process described above and it also comprises the step of stopping the flow of the curtain when a position of the reflected beam on the collector is offset from a set position in relation to the reference position.

The present invention also relates to a detection apparatus for detecting a fault in a flowing liquid sheet comprising: a radiating source for emitting an electromagnetic beam; a shifting device adapted to move the radiating source so that the beam transmitted by the radiating source irradiates approximately the entire width of the sheet in an approximately transverse direction to the sheet; and a collector to recover a beam reflected by the sheet.

The present invention also relates to a detection apparatus for detecting a fault in a flowing liquid sheet comprising: a radiating source for emitting an electromagnetic beam; a slot through which the source irradiates approximately the entire width of the sheet in a direction approximately transverse to the sheet; and a collector to recover a beam reflected by the sheet.

BRIEF DESCRIPTION OF THE DRAWINGS

Other characteristics will appear on reading the description that follows, making reference to the drawings wherein.

DETAILED DESCRIPTION OF THE DRAWINGS

The detection process of the invention is intended to detect a fault in a flowing liquid sheet. It can act on any sort of liquid sheet composed of any sort of liquid composition. Clearly the process of the invention will preferably be used to detect faults in a sheet whose uniformity is important.

Figure 1:
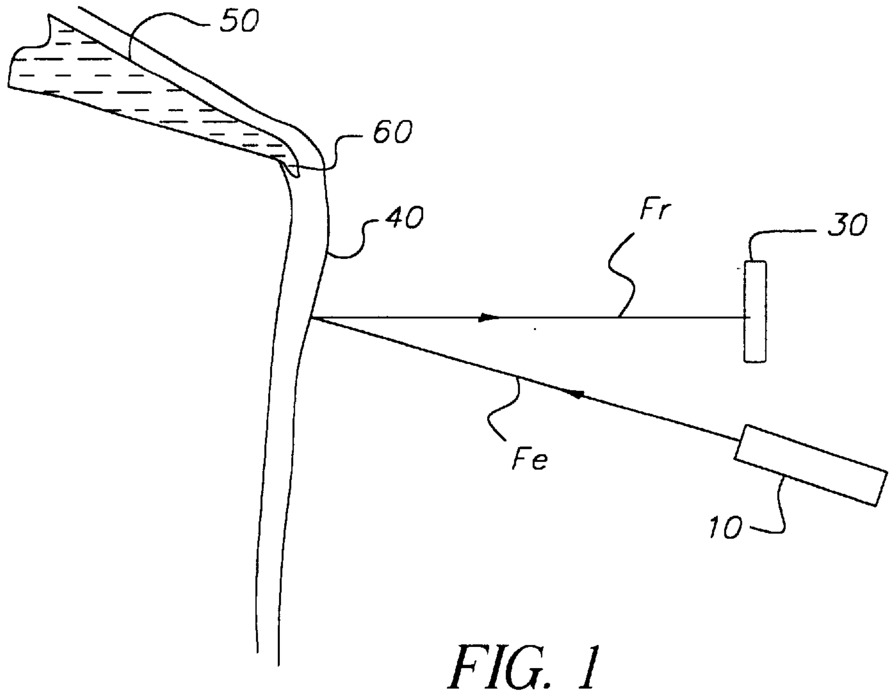
FIG. 1 represents a diagrammatic cross-section of the utilization of the process of the invention.
Figure 2:
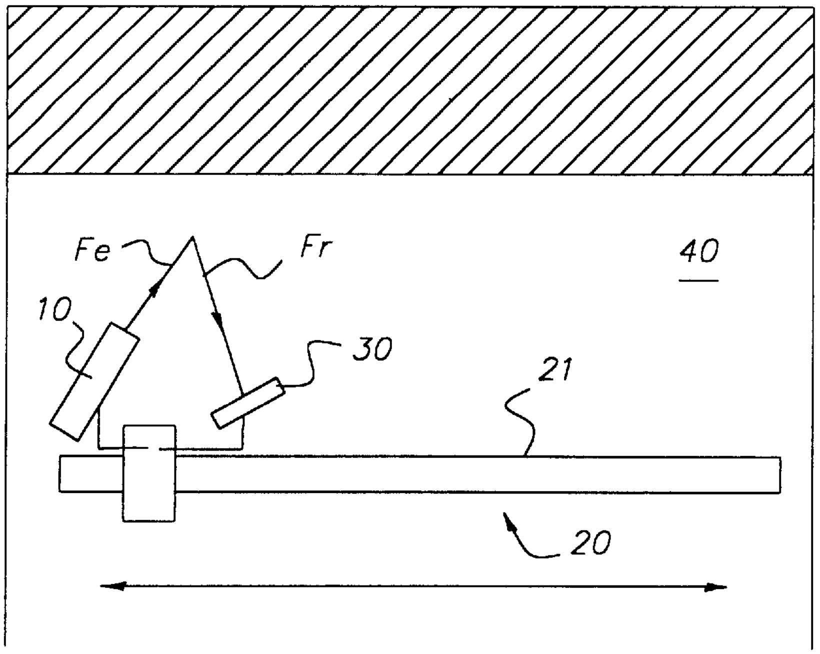
FIG. 2 represents a front view of a first embodiment of the apparatus utilizing the process of the invention.

With reference to FIGS. 1 and 2, a first embodiment of the apparatus utilizing the process of the invention can be seen. The apparatus comprises an electromagnetic or radiating source 10, for example approximately a point source, for emitting an electromagnetic beam $F_e$. A means 20 (FIG. 2) is provided to enable an emitted beam $F_e$ to irradiate practically an entire width of a sheet 40. The electromagnetic source 10 can be placed in various positions in relation to the horizontal axis of sheet 40, the vertical angle of incidence of the emitted beam $F_e$ not being important. However, it is preferable that the angle of incidence of the emitted beam $F_e$ is constant throughout the scanning. The means 20 is, for example, a rail 21 only shown in FIG. 2, provided to move or shift the electromagnetic source 10. The movement axis of the electromagnetic source 10 is approximately parallel to the sheet 40. The apparatus also comprises a collector 30. The collector 30 is, for example, a simple screen that is observed with the naked eye or by means of a camera, or even a position detector. The collector 30 is intended to recover or receive a reflected beam $F_r$ from the sheet 40. The collector 30 is arranged opposite the sheet 40 so that the collector 30 throughout the scanning can intercept the beam $F_r$ that is reflected by the sheet 40. As seen in FIG. 2, the collector 30 is solid with the electromagnetic source so that the movements on the rail 21 of the electromagnetic source 10 and the collector 30 are synchronized.

Figure 3:
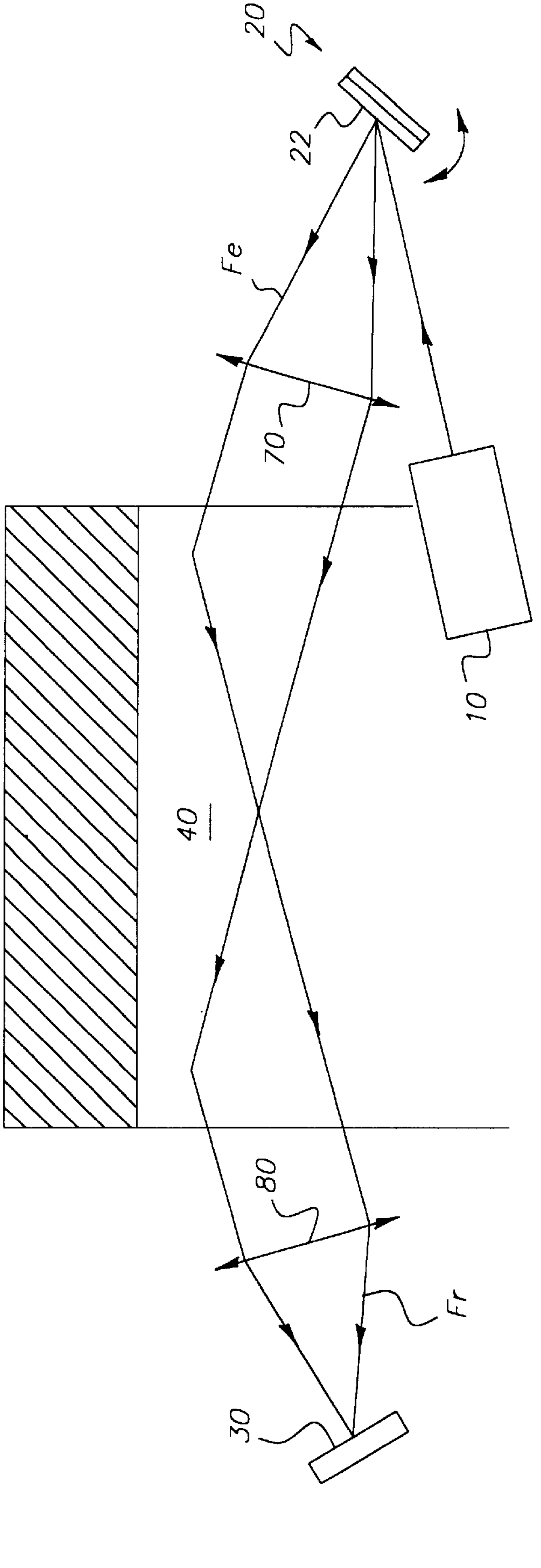
FIG. 3 represents a front view of a second embodiment of an apparatus utilizing the process of the invention.
Figure 4:
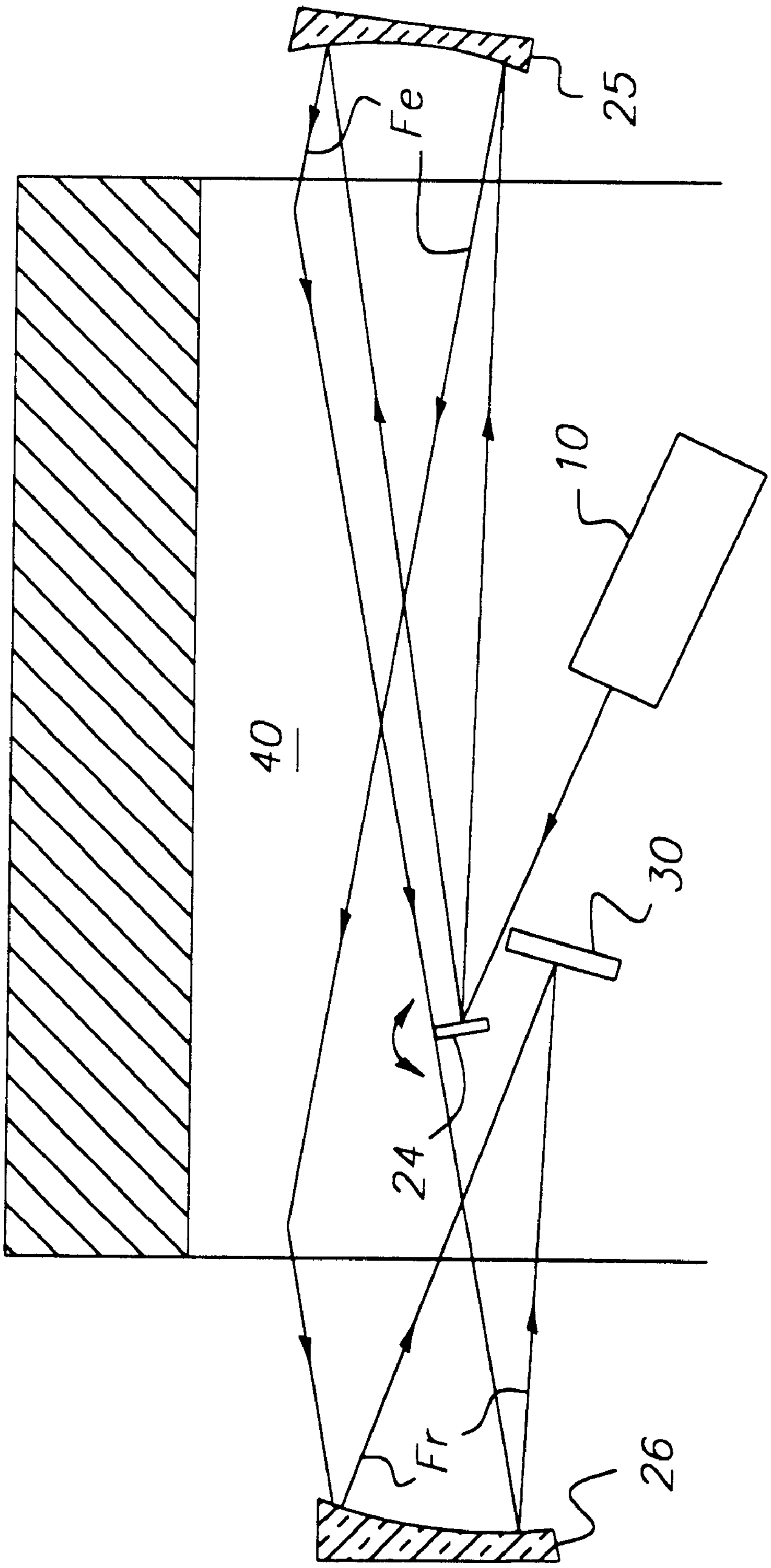
FIG. 4 represents a front view of a third embodiment of an apparatus utilizing the process of the invention.

With reference to FIG. 3, a second embodiment of the apparatus utilizing the process of the invention can be seen. According to this embodiment, the means 20 for irradiating practically the entire width of the sheet is a rotating mirror 22. So that the angle of incidence of the emitted beam $F_e$ is constant throughout the scanning, an optical device is provided, for example a plane-convex lens 70, that enables the beam $F_e$ emitted by the electromagnetic source 10, whatever the position of the mirror 22, to itself arrive at the sheet 40 with the same angle of incidence. A second lens 80 is provided to make the beam $F_r$ that is reflected by the sheet 40 converge onto the collector 30, the collector 30 not moving in this embodiment. Here again the collector 30 can be a simple screen that is observed with the naked eye or by means of a camera, or again a position detector. According to a variant of this embodiment shown in FIG. 4, the optical system comprises a first rotating mirror 24 which reflects the electromagnetic beam $F_e$ onto a second parabolic mirror 25. The second mirror 25 reflects the beam $F_e$ onto the sheet 40. A third parabolic mirror 26 receives the beam $F_r$ reflected by the sheet 40 and sends it on to the collector 30.

Figure 5:
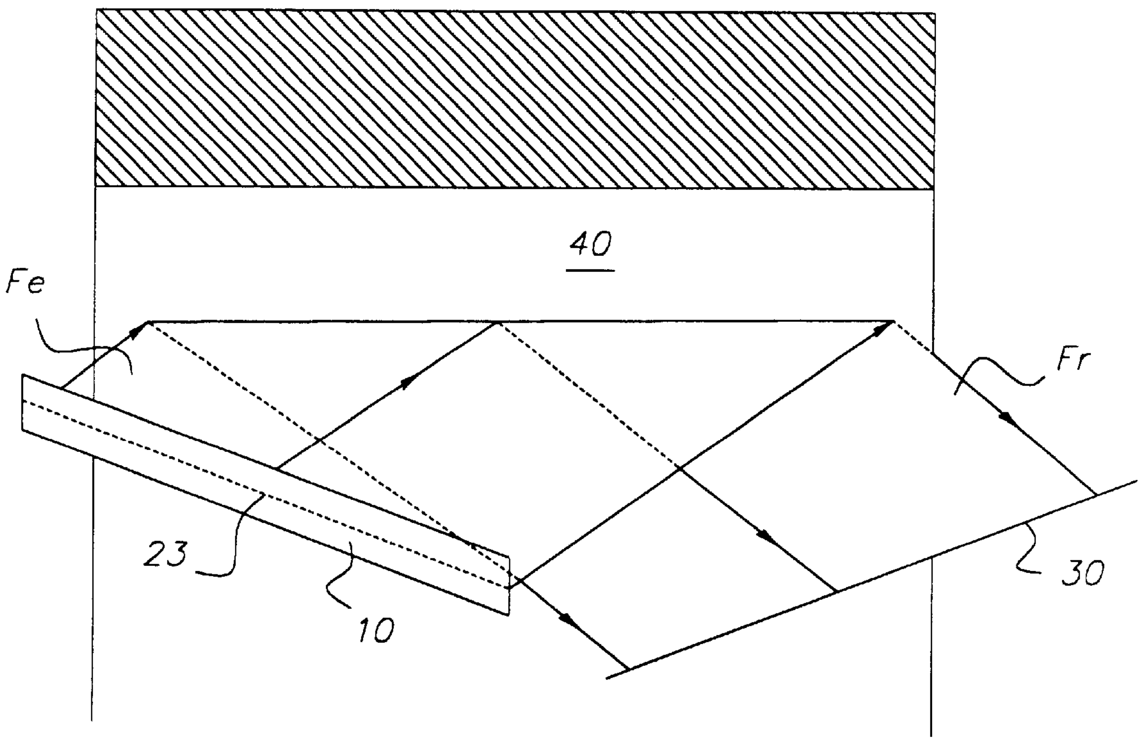
FIG. 5 represents a top view of a fourth embodiment of an apparatus utilizing the process of the invention.

With reference to FIG. 5, a fourth embodiment of the apparatus utilizing the process of the invention can be seen. In this embodiment, the means 20 for irradiating practically the entire width of the sheet 40 is a slot 23 through which the electromagnetic source 10 diffuses. The slot 23 is arranged so that a flat beam $F_e$ is emitted and lights approximately the entire width of the sheet 40. The collector 30 is for example a screen. The collector 30 can also be a special paper suitable for detecting the position of the reflected beam $F_r$ as well as the variations of intensity received.

The steps of the process of the invention are as follows. First, an electromagnetic beam $F_e$ is emitted onto the flowing liquid sheet 40 so as to irradiate approximately the entire width of the sheet 40. The electromagnetic beam can be for example a light beam, a visible light laser or again infrared. According to the first embodiment, the beam is moved by means of a rail 21. The beam reflected by the sheet is recovered by means of the collector 30 moved in a synchronized way with the electromagnetic source.

According to the second embodiment, the emitted electromagnetic beam $F_e$ is moved by means of a rotating mirror 22. The lens 70 enables the emitted beam $F_e$ to arrive with the same angle of incidence on the sheet 40. The lens 80 enables the beam $F_r$ reflected by the sheet 40 to converge onto the collector 30. Preferably, the collector 30 is arranged approximately perpendicular to the reflected beam when the sheet 40 is in a stable position, i.e. when it does not have any fault. A reference position of the beam $F_r$ reflected by the sheet 40 onto the collector 30 is previously defined. This reference position corresponds to a situation wherein no fault is noted on the sheet 40. Clearly those skilled in the art will take account of the actual position of the sheet in order to define this reference position. A liquid sheet is practically never perfectly flat over its entire width. Therefore, the reference position can vary according, either to the position of the source on the rail, or to the angle of inclination of the rotating mirror. Thus, when the emitted beam $F_e$ moves, the position of the reflected beam $F_r$ on the collector 30 is compared with the reference position of the reflected beam $F_r$. If this position is different from the reference position, this means that the reflected beam $F_r$ has been deviated by a fault present in the sheet 40 which results in a non-uniformity of the surface of the sheet 40.

According to the fourth embodiment, the emitted beam $F_e$ is emitted through a slot 23. Thus a flat beam irradiates approximately the entire width of the sheet 40 in a direction approximately transverse to the sheet 40. The reflected beam $F_r$ is then recovered by the collector 30 which can be a simple screen that is observed, for example, by means of a camera. The collector 30 can, for example, be the width of the sheet. Preferably, a smaller collector will be used that can be moved by a rail so as to recover the whole beam $F_r$. Then the deviations in relation to a reference position are observed. It is also possible to provide for detection of the variations of light intensity using the collector. By utilizing a special paper as the collector, the variations of position and intensity can easily be recorded.

It is also possible to provide for measurement of the angle of reflection of the reflected beam $F_r$ so as to quantify the detected fault. The use of a graduated screen or again a position detector enables this angle to be measured directly.

According to a particular embodiment of the invention, the fault detection process is used in a curtain coating process, for example a photographic coating process. A curtain 40 is formed by running a photographic composition down an inclined surface 50 to a lip 60 as shown in FIG. 1. The composition then leaves the surface 50 at the lip 60 to form an approximately vertical curtain 40. In this embodiment, an electromagnetic beam $F_e$ is emitted that has a wavelength so that the beam does not disturb the photographic composition. For example an infrared beam is chosen for emission. Approximately the entire width of the curtain 40 is irradiated with the beam $F_e$ in a direction approximately transverse to the curtain 40 by using one of the apparatuses utilizing the process described above. Preferably, the emitted beam $F_e$ irradiates the curtain 40 at a distance of between 0 and 10 cm from the lip 60, preferably a distance of about 2 cm from the lip so as to detect all the waves. Some waves start vertically, and it is more certain to detect them from the start of the formation of the curtain 40 so as to observe a more characteristic deviation of the reflected beam $F_r$. It is also possible to provide for measurement of the angle of reflection of the reflected ray $F_r$. Beyond a threshold value of the deviation in relation to the reference position, it is provided to stop the flow of the curtain. The value of this critical angle depends on the sensitivity of the product to the faults caused by these non-uniformities. For example for very sensitive products this threshold can be set to 0.1° and for other less sensitive products to 1°.

Transverse irradiation of the curtain enables detection of all the surface faults that appear upstream in a coating curtain and especially the edge waves and standing waves. Vertical scanning would not enable detection of faults propagating without crossing the scanning line. Moreover, detection sensitivity would vary with the scanning because most of the waves dampen during their propagation. Further, in the case of a multi-layer coating process with an inclined plane, it is known that the surface of the sheet is not flat in the vertical direction. This makes it much more difficult to detect faults by vertical scanning.

The invention has been described in detail with particular reference to certain preferred embodiments thereof, but it will be understood that variations and modifications can be effected within the spirit and scope of the invention.

What is claimed is:

1. A process for detecting a fault in a surface of a flowing liquid sheet, the process comprising the steps of:

transmitting an electromagnetic beam to the sheet so as to irradiate approximately an entire width of the sheet in a direction approximately transverse to the sheet;

recovering a position of a beam reflected by the sheet on a surface of a collector, said reflected beam being the reflection, from the sheet, of the transmitted electromagnetic beam;

noting deviations of the position of the reflected beam on the surface of the collector with respect to a previously defined reference position on the surface of said collector corresponding to a situation wherein no fault is noted on the flowing sheet; and stopping the flow of the flowing liquid sheet if a deviation corresponding to the reflected beam position on the collector from the previously defined reference position of said reflected beam on said collector is beyond a threshold value of said deviation.

2. A detection process according to claim 1, wherein the electromagnetic beam is emitted by an electromagnetic source which is moved in the transverse direction by means of a rail, the collector being moved in a synchronized way with the electromagnetic source.

3. A detection process according to claim 2, wherein the beam reflected by the sheet is recovered by the collector which is arranged approximately perpendicular to a plane defined by the sheet when the sheet is in a stable position.

4. A detection process according to claim 3, wherein the collector is a position detector.

5. A detection process according to claim 3, wherein the collector is a screen on which the deviations of the reflected beam are observed by means of a camera.

6. A detection process according to claim 1, wherein the electromagnetic beam is emitted by an electromagnetic source which is moved by means of a rotating mirror.

7. A detection process according to claim 6, wherein the beam reflected by the sheet is recovered by the collector which is arranged approximately perpendicular to a plane defined by the sheet when the sheet is in a stable position.

8. A detection process according to claim 7, wherein the collector is a position detector.

9. A detection process according to claim 7, wherein the collector is a screen on which the deviations of the reflected beam are observed by means of a camera.

10. A detection process according to claim 1, wherein the electromagnetic beam irradiates approximately the entire width of the sheet through a slot.

11. A process according to claim 10, wherein the reflected beam is recovered on a suitable paper.

12. A process according to claim 1, wherein the emitted beam is a light beam.

13. A process according to claim 1, wherein the emitted beam is a laser beam using visible or infrared light.

14. A process according to claim 1, wherein the electromagnetic beam irradiates the sheet in a direction approximately transverse to said sheet at a distance of between 0 and 10 cm from a lip where an approximately vertical flowing liquid sheet is formed.

15. A process according to claim 1, wherein the electromagnetic beam irradiates the sheet in a direction approximately transverse to said sheet at a distance of about 2 cm from a lip where the liquid sheet is formed.

* * * * *